US011279640B2

(12) United States Patent
Kubota et al.

(10) Patent No.: US 11,279,640 B2
(45) Date of Patent: *Mar. 22, 2022

(54) WASTEWATER TREATMENT DEVICE AND WASTEWATER TREATMENT METHOD

(71) Applicant: IHI CORPORATION, Tokyo (JP)

(72) Inventors: Nobuhiko Kubota, Tokyo (JP); Yuka Yoshida, Tokyo (JP); Xia Huang, Beijing (CN); Chun Liu, Hebei (CN); Jing Zhang, Beijing (CN); Hong Zheng Zhou, Beijing (CN); Xiao Xuan Chen, Beijing (CN); Lei Zhang, Beijing (CN)

(73) Assignee: IHI CORPORATION, Tokyo (JP)

(*) Notice: Subject to any disclaimer, the term of this patent is extended or adjusted under 35 U.S.C. 154(b) by 141 days.

This patent is subject to a terminal disclaimer.

(21) Appl. No.: 16/817,834

(22) Filed: Mar. 13, 2020

(65) Prior Publication Data
US 2020/0216343 A1 Jul. 9, 2020

Related U.S. Application Data

(63) Continuation of application No. 16/166,311, filed on Oct. 22, 2018, now Pat. No. 10,626,032, which is a
(Continued)

(30) Foreign Application Priority Data

Jul. 28, 2016 (CN) .................. 201610609203.X

(51) Int. Cl.
C02F 1/78 (2006.01)
C02F 3/04 (2006.01)
(Continued)

(52) U.S. Cl.
CPC .............. *C02F 1/78* (2013.01); *B01F 23/231* (2022.01); *C02F 1/008* (2013.01); *C02F 1/725* (2013.01);
(Continued)

(58) Field of Classification Search
CPC .. C02F 1/78; C02F 11/06; C02F 3/006; C02F 9/00; Y10S 210/903
See application file for complete search history.

(56) References Cited

U.S. PATENT DOCUMENTS 5,053,140 A 10/1991 Hurst
5,192,452 A * 3/1993 Mitsui ................. B01J 23/34
210/760
(Continued)

FOREIGN PATENT DOCUMENTS

CA 3000607 A1 4/2017
JP H08-103778 A 4/1996
(Continued)

OTHER PUBLICATIONS

Japan Patent Office, "Decision to Grant a Patent," issued in Japanese Patent Application No. 2018-530434, which is a Japanese counterpart of U.S. Appl. No. 16/817,834, dated Sep. 29, 2020, 2 pages.
(Continued)

Primary Examiner — Ana M Fortuna

(57) ABSTRACT

A wastewater treatment device has: an ozone generator which supplies ozone; a mixer which mixes ozone supplied from the ozone generator with wastewater and supplies ozone mixed wastewater; an ozone oxidation unit which progresses ozone oxidation in the ozone mixed wastewater while passing the ozone mixed wastewater therethrough and discharges wastewater in which the ozone has been consumed; a biological treatment unit which performs biological treatment on the wastewater discharged from the ozone
(Continued)

oxidation unit using microorganisms; and an adjusting device which adjusts the amount of ozone to be mixed with the wastewater by the mixer so that ozone in an amount that inhibits the microorganisms of the biological treatment unit does not remain in the wastewater discharged from the ozone oxidation unit.

19 Claims, 4 Drawing Sheets

Related U.S. Application Data continuation of application No. PCT/JP2017/027528, filed on Jul. 28, 2017.

(51) Int. Cl.
*C02F 3/08* (2006.01)
*C02F 3/02* (2006.01)
*C02F 3/00* (2006.01)
*C02F 3/12* (2006.01)
*C02F 1/00* (2006.01)
*C02F 1/72* (2006.01)
*C02F 3/30* (2006.01)
*C02F 3/10* (2006.01)
*C02F 101/10* (2006.01)
*C02F 101/16* (2006.01)
*B01F 23/231* (2022.01)

(52) U.S. Cl.
CPC ............... *C02F 3/006* (2013.01); *C02F 3/02* (2013.01); *C02F 3/04* (2013.01); *C02F 3/082* (2013.01); *C02F 3/12* (2013.01); *C02F 3/302* (2013.01); *C02F 3/101* (2013.01); *C02F 3/106* (2013.01); *C02F 3/107* (2013.01); *C02F 2101/101* (2013.01); *C02F 2101/16* (2013.01); *C02F 2201/782* (2013.01); *C02F 2201/784* (2013.01); *C02F 2209/003* (2013.01); *C02F 2209/23* (2013.01); *C02F 2209/235* (2013.01); *C02F 2301/046* (2013.01); *C02F 2301/08* (2013.01); *C02F 2303/18* (2013.01); *C02F 2303/26* (2013.01); *Y02W 10/10* (2015.05)

(56) References Cited

U.S. PATENT DOCUMENTS

| | | | |
|---|---|---|---|
| 5,851,399 A | 12/1998 | Leitzke | |
| 6,007,720 A | 12/1999 | Tomita | |
| 6,403,031 B1 * | 6/2002 | Escude | B01J 23/75 422/28 |
| 6,962,654 B2 * | 11/2005 | Arnaud | B01D 21/2433 210/143 |
| 7,309,432 B1 | 12/2007 | Fabiyi | |
| 8,882,876 B2 * | 11/2014 | Battenfeld | B01D 39/18 55/527 |
| 10,626,032 B2 * | 4/2020 | Kubota | B01F 15/0408 |
| 2002/0030021 A1 * | 3/2002 | Pappa | C02F 1/725 210/748.14 |
| 2003/0173276 A1 | 9/2003 | Arnaud | |
| 2005/0145575 A1 | 7/2005 | Yasunaga et al. | |
| 2007/0068869 A1 | 3/2007 | Yamasaki et al. | |
| 2009/0301965 A1 | 12/2009 | Schwerdt et al. | |
| 2015/0232353 A1 * | 8/2015 | Denvir | B01F 3/04241 210/748.19 |
| 2017/0215428 A1 | 8/2017 | Takahashi et al. | |
| 2018/0072597 A1 | 3/2018 | Imamura et al. | |
| 2018/0124543 A1 | 5/2018 | Leppänen et al. | |
| 2019/0248681 A1 * | 8/2019 | Jasim | C02F 1/444 |

FOREIGN PATENT DOCUMENTS

| | | |
|---|---|---|
| JP | H09-511448 A | 11/1997 |
| JP | H11-033592 A | 2/1999 |
| JP | H11-221584 A | 8/1999 |
| JP | H11-314085 A | 11/1999 |
| JP | 2005-270885 A | 10/2005 |
| JP | 2007-090206 A | 4/2007 |
| JP | 2009-254967 A | 11/2009 |
| JP | 2010-069387 A | 4/2010 |
| JP | 2011-078945 A | 4/2011 |
| JP | 2015-128751 A | 7/2015 |
| JP | 2015-226889 A | 12/2015 |
| JP | 2016-106534 A | 6/2016 |
| JP | 2016-203174 A | 12/2016 |
| KR | 10-1219892 B1 | 1/2013 |
| KR | 10-1528712 B1 | 6/2015 |
| WO | 2016/021523 A1 | 2/2016 |
| WO | 2016/089104 A1 | 6/2016 |

OTHER PUBLICATIONS

Japan Patent Office, "Office Action", issued in Japanese Patent Application No. 2018-530434, which is a Japanese counterpart of U.S. Appl. No. 16/166,311, dated Feb. 4, 2020, 4 pages.

United States Patent and Trademark Office, "Non-Final Office Action", issued in U.S. Appl. No. 16/166,311, dated Aug. 2, 2019, 14 pages.

* cited by examiner

WASTEWATER TREATMENT DEVICE AND WASTEWATER TREATMENT METHOD

CROSS REFERENCE TO RELATED APPLICATIONS

This application is a continuation application of co-pending U.S. application Ser. No. 16/166,311, filed on Oct. 22, 2018, which is a continuation application of International Application No. PCT/JP2017/027528, filed on Jul. 28, 2017, which claims priority to Chinese Patent Application No. 201610609203.X, filed on Jul. 28, 2016, the entire contents of which are incorporated by reference herein.

BACKGROUND

Technical Field

The present disclosure relates to a wastewater treatment device and a wastewater treatment method capable of performing advanced treatment of industrial wastewater utilizing ozone oxidation reaction and biological treatment using microorganisms.

Description of the Related Art

Industrial wastewater (wastewater from chemical industry, agriculture, printing factories, dyeing plants, and the like) contains a large amount of persistent organic pollutants, and in conventional biological treatment processes, the persistent organic pollutants still remain in terminal water of biological treatment. Therefore, since the terminal water of the biological treatment of the industrial wastewater does not reach effluent standards, pollutants cannot be completely removed after introduction into municipal wastewater treatment plants, which adversely affects the municipal wastewater treatment plants. Thus, the treatment of highly polluted industrial wastewater is a global and important issue that the processing of industrial wastewater currently faces.

Biodegradability by biological treatment of terminal drainage of industrial wastewater is extremely different depending on wastewater, and it is difficult to process the terminal wastewater using the biological treatment directly. In a practical strategy, the treatment process currently mainly used is advanced treatment including coagulation sedimentation, adsorption, and chemical oxidation.

In order to realize the advanced wastewater treatment of the industrial wastewater, technologies of treating wastewater by combining the oxidation reaction or the photochemical reaction by ultraviolet light have been proposed. Japanese Patent Application Laid-open No. 2015-128751 (Publication Document 1 below) discloses wastewater treatment which is a combination of the biological treatment with Fenton treatment which is oxidation treatment.

Further, ozone oxidation is a more general technology in the advanced treatment of the terminal water by the biological treatment of the industrial wastewater. However, when the ozone oxidation technology is used alone, treatment cost is frequently increased to realize the advanced treatment of the industrial wastewater. For this reason, the combination of the ozone oxidation technology with the biological treatment has been studied to reduce the treatment costs. Japanese Patent Application Laid-open No. 2015-226889 (Publication Document 2 below) discloses treatment of a liquid containing an amine-based organic compound, obtained by combining the oxidation treatment for introducing an oxidizing agent to decompose the amine-based organic compound with the biological treatment, and discloses that ozone is used as the oxidizing agent.

DOCUMENTS LIST

Publication Document 1: Japanese Patent Application Laid-open No. 2015-128751
Publication Document 2: Japanese Patent Application Laid-open No. 2015-226889

BRIEF SUMMARY

However, the Fenton treatment utilized in the above-mentioned Publication Document 1 requires much time and labor because it has an increased number of processes. On the other hand, since the ozone oxidation treatment utilized in the above-mentioned Publication Document 2 has low solubility of ozone in water and weak oxidizing ability of ozone, the ozone oxidation treatment has drawbacks such as a slow mass transfer rate between gas and liquid and low ozone utilization efficiency. Further, in Publication Document 2, since the ozone oxidation treatment is carried out at a pH significantly different from the subsequent biological treatment, a process of adjusting the pH at the time of shifting to the biological treatment is necessary, and the treatment cost is increased. Furthermore, even when unused ozone is discharged from wastewater, the ozone utilization efficiency is lowered.

Further, in any of the above-described wastewater treatments, aeration is performed in order to activate treatment with aerobic microorganisms. However, the aeration of wastewater requires power, and, from the viewpoint of energy consumption, it is preferred to perform the wastewater treatment without using the aeration.

The present disclosure has been made in view of the above-described problems, and it is an object of the present invention to provide a wastewater treatment device and a wastewater treatment method capable of preventing an inhibition of biological treatment while enjoying advantages of wastewater treatment by ozone oxidation, reducing wastewater treatment costs, and realizing excellent treatment by a simple process.

According to an aspect of the present disclosure, a wastewater treatment device is summarized to include: an ozone generator which supplies ozone; a mixer which mixes ozone supplied from the ozone generator with wastewater and supplies ozone mixed wastewater; an ozone oxidation unit which progresses ozone oxidation in the ozone mixed wastewater while passing the ozone mixed wastewater therethrough and discharges wastewater in which the ozone has been consumed; a biological treatment unit which has microorganisms for biological treatment and performs the biological treatment on the wastewater discharged from the ozone oxidation unit using the microorganisms; and an adjusting device which adjusts the amount of ozone to be mixed with the wastewater by the mixer so that ozone in an amount that inhibits the microorganisms of the biological treatment unit does not remain in the wastewater discharged from the ozone oxidation unit.

It is suitable that the adjusting device includes: a measuring device which measures the amount of ozone in the wastewater discharged from the ozone oxidation unit; and a regulating valve capable of regulating the amount of ozone to be mixed with the wastewater by the mixer, and the regulating valve is adjusted based on the measurement by the measuring device in such a manner that the amount of ozone in the wastewater is lower than a level at which the microorganisms are inhibited.

The wastewater treatment device may further include: a release passage for avoiding the supply of the wastewater to the biological treatment unit when the ozone remains in the wastewater discharged from the ozone oxidation unit; and a control valve which stops the supply of the wastewater to the biological treatment unit when the amount of ozone in the wastewater is equal to or higher than the level at which the microorganisms are inhibited, based on the measurement by the measuring device. The release passage may be a return passage capable of supplying the wastewater discharged from the ozone oxidation unit to the mixer, and the wastewater may flow through the return passage when the supply of the wastewater to the biological treatment unit is stopped by the control valve.

It is suitable that the mixer includes a bubble generator, and ozone is dispersed in the ozone mixed wastewater in a state of bubble. It is suitable that the bubble generator is a microbubble generator which generates fine bubbles having a bubble diameter of 10 to 50 μm. The ozone oxidation unit may have a catalyst that promotes an ozone oxidation reaction, and the ozone oxidation unit may be configured in a multistage structure in which a plurality of catalyst beds on which the catalyst is supported are stacked in a vertical direction, and may be configured so that the ozone mixed wastewater may sequentially pass through the plurality of catalyst beds while being introduced from a bottom part of the ozone oxidation unit and rising toward a top part of the ozone oxidation unit.

When a difference in height between the biological treatment unit and the ozone oxidation unit is provided so that a water level in the biological treatment unit is lower than that in the ozone oxidation unit, and the wastewater of the ozone oxidation unit is supplied to the biological treatment unit using a gravity action due to the difference in height, it is suitable in terms of reducing operating energy. The wastewater treatment device may further include an ozone decomposing device which decomposes ozone remaining in the wastewater discharged from the ozone oxidation unit when ozone remains in the wastewater discharged from the ozone oxidation unit.

In addition, according to an aspect of the present disclosure, the wastewater treatment method is summarized to include: ozone generation that supplies ozone; mixing preparation for mixing the ozone supplied by the ozone generation with wastewater to supply ozone mixed wastewater; ozone oxidation treatment in which ozone oxidation is allowed to proceed in the ozone mixed wastewater, to discharge the wastewater in which the ozone has been consumed; and biological treatment in which the wastewater after the ozone oxidation treatment is biologically treated with microorganisms, wherein an amount of ozone mixed with the wastewater in the mixing preparation is adjusted so that ozone in an amount that inhibits the microorganisms of the biological treatment does not remain in the wastewater discharged from the ozone oxidation treatment.

A ratio of ozone to be mixed with the wastewater may be adjusted according to a flow rate of the wastewater supplied to the ozone oxidation treatment and water quality of the wastewater so that an appropriate amount of ozone is mixed with the wastewater in the mixing preparation. It is suitable for application to an advanced treatment for treating industrial wastewater containing a persistent organic substance.

According to the present disclosure, it is possible to provide a wastewater treatment device capable of improving the ozone utilization rate to enhance oxidation ability, and improving the removal efficiency of persistent chemical substances, and it is also possible to sufficiently supply the biological treatment with oxygen without performing the aeration by using dissolved oxygen generated after the ozone reaction, thereby reducing operating costs required for wastewater treatment.

DETAILED DESCRIPTION OF EMBODIMENTS

Figure 1:
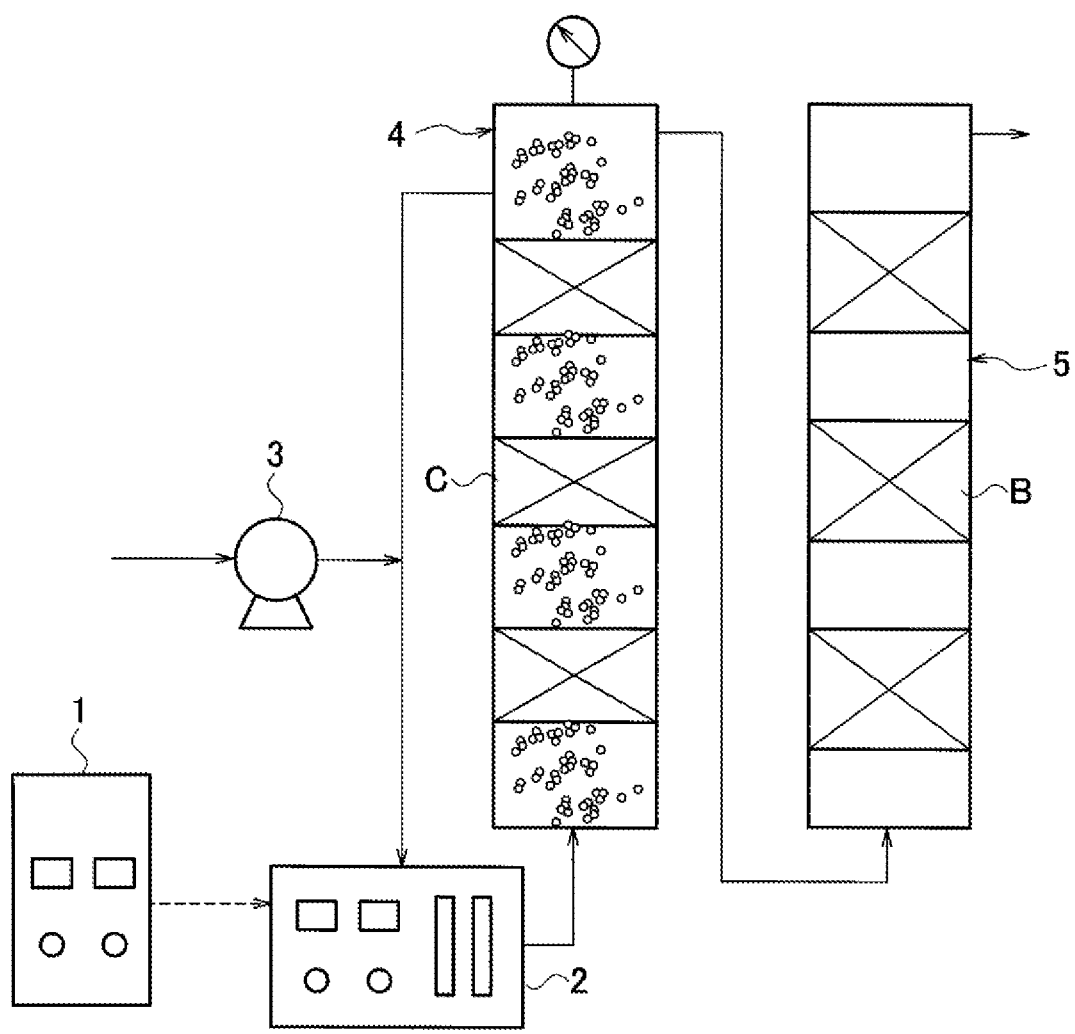
FIG. 1 is a schematic configuration diagram showing a basic configuration of a wastewater treatment device according to the present disclosure.

Embodiments of the present disclosure will be described in detail below with reference to the drawings. Here, it is noted that dimensions, materials, other specific numerical values, and the like shown in the embodiments are merely examples for facilitating understanding of the invention, and do not limit the present invention unless otherwise noted. In addition, in the specification and the drawings of the present application, elements having substantially the same function and configuration are denoted by the same reference numerals, and redundant explanations thereof are omitted and elements not directly related to the present invention are not shown.

Industrial wastewater contains high concentrations of organic pollutants, and purification by biological treatment alone causes an excessive burden on microorganisms. In addition, since the industrial wastewater contains a large amount of organic substances which are hardly decomposed by the microorganisms, the industrial wastewater is not sufficiently purified and therefore the persistent organic substances may remain. On the other hand, since ozone oxidation, which is a chemical treatment, can decompose larger organic molecules with less degradability into smaller organic molecules, it is possible to improve the biodegradability of the industrial wastewater by applying ozone oxidation technologies to the industrial wastewater to remove a part of the organic pollutants, such that the burden on the microorganisms in the biological treatment can be reduced. In particular, the ozone oxidation is effective for decomposition or lowering of molecular weight of compounds having an amino group, a chloro group, a nitro group, a sulfo group and the like; an ether compound, an unsaturated compound, an aromatic compound, a cyclic compound, and the like. For example, the aromatic compound having the nitro group can be decomposed into saturated hydrocarbon and ammonia nitrogen. In the present disclosure, ozone mixed wastewater (mixture in which ozone is dispersed in wastewater) which is mixed and prepared by a mixer is introduced into an ozone oxidation unit to advance the ozone oxidation reaction (ozone oxidation treatment). Then the wastewater in which the ozone has been consumed is subjected to the biological treatment with the microorganisms in a biological tank.

However, since the ozone inhibits growth and activity of the microorganisms and makes the progress of the biological treatment difficult, it is necessary to avoid the introduction of unused residual ozone into biological treatment along with the wastewater that has been subjected to the ozone oxidization treatment.

The wastewater treatment device shown in FIG. 1 includes an ozone generator 1, a microbubble generator 2, a suction pump 3, an ozone oxidation unit 4, and a biological treatment unit 5. The microbubble generator 2 functions as a mixer of ozone and wastewater, and disperses the ozone in the form of fine microbubbles in the wastewater. The ozone oxidation unit 4 is configured as an airtight pressure vessel, and has a plurality of catalyst beds C carrying a heterogeneous catalyst for an ozone oxidation reaction therein. It is configured in a multistage structure in which the plural catalyst beds C are stacked in a vertical direction. The biological treatment unit 5 is configured in a multistage structure in which a plurality of biological beds B having a biofilm on its surface respectively are arranged inside the biological treatment unit 5.

In the wastewater treatment device of FIG. 1, the ozone generator 1 generates ozone using pure oxygen as a raw material, in which the ozone is introduced into microbubble generator 2. At the same time, the wastewater pumped by driving of the suction pump 3 is also supplied to the microbubble generator 2 and mixed with ozone. In the microbubble generator 2, the ozone mixed wastewater in which the ozone is dispersed in a microbubble state is prepared. The ozone mixed wastewater flows into the ozone oxidation unit 4 from a bottom inlet. The supplied ozone mixed wastewater rises from a bottom part toward a top part of the ozone oxidation unit 4, and sequentially passes through the plurality of catalyst beds C in the meantime, thereby promoting the ozone oxidation by contact with the catalyst. The wastewater in the ozone oxidation unit 4 can be discharged under pressure. If the ozone is consumed by the ozone oxidation reaction, oxygen is generated, and oxygen with high water solubility is contained in the wastewater as dissolved oxygen. The wastewater is circulated between the microbubble generator 2 and the ozone oxidation unit 4, during which the wastewater is discharged from the ozone oxidation unit 4 depending on the amount of wastewater supplied from the suction pump 3 and is supplied to the biological treatment unit 5. The wastewater supplied to the biological treatment unit 5 rises from the bottom part of the biological treatment unit 5 toward the top part of the biological treatment unit 5, and passes through the biological beds B in the meantime. Since the wastewater supplied to the biological treatment unit 5 contains high-concentration dissolved oxygen, an aerobic reaction by microorganisms proceeds. As the treatment proceeds, oxygen is consumed, and the treated water after the biological treatment is discharged from an upper end of the biological treatment unit 5.

Since the ozone inhibits the microorganisms and makes the progress of the biological treatment difficult, if the ozone remains in the wastewater that has been subjected to the ozone oxidation treatment, it is necessary to avoid the introduction into the biological treatment unit 5. The wastewater treatment device and the wastewater treatment method proposed in the present disclosure also include improvements based on such viewpoints, and it is possible to easily set conditions for the wastewater treatment and change them, and also to automatically control the treatment operations. The wastewater treatment device has an adjusting device for adjusting the amount of ozone to be mixed in the wastewater, and the amount of the ozone to be mixed with the wastewater is adjusted so that ozone in an amount that inhibits the microorganisms for the biological treatment does not remain in the wastewater in which the ozone has been consumed in the ozone oxidation unit for progressing the ozone oxidation reaction. Therefore, in the ozone mixed wastewater prepared by the mixer, the amount of ozone to be mixed with the wastewater is appropriately adjusted. The ozone oxidation reaction in the mixed wastewater is performed in the ozone oxidation unit (ozone oxidation treatment), and then, when the wastewater which has consumed the ozone is subjected to the biological treatment by microorganisms, ozone does not remain in such the amount that inhibits the microorganisms for the biological treatment. When adjusting the mixed amount of the ozone, if ozone in an amount that inhibits the microorganisms remains in the wastewater discharged from the ozone oxidation treatment, supply of wastewater to the biological treatment unit is avoided by utilizing the release passage to protect the microorganisms from the residual ozone. In the configuration of FIG. 1, it is possible to return the wastewater to the microbubble generator 2 from the top part of the ozone oxidation unit 4. When the water quality of wastewater is not changed, it is possible to stably continue the wastewater treatment by adjusting the amount of ozone. Further, to cope with the change in the water quality or the treatment conditions, the above-described adjustment is repeated and the supply of wastewater to the biological treatment can be controlled by using the release passage. That is, when the ozone remains in the wastewater after the ozone oxidation treatment, the supply of wastewater to the biological treatment is suppressed so that the microorganisms for the biological treatment are not inhibited by the remaining ozone. Based on the above control, improvements are made relating to the determination of suitable treatment conditions of the wastewater, and relating to the monitoring and condition change while the wastewater treatment is stably continued under the determined treatment conditions. The release passage can be configured as a return passage through which the wastewater discharged from the ozone oxidation unit can be directly supplied to the mixer. Alternatively, the release passage may be a return passage which is configured to be able to indirectly supply the wastewater discharged from the ozone oxidation unit to the mixer via a wastewater source.

The concentration of ozone that inhibits microorganisms is changed depending on the type and growth state of the used microorganisms, the contact time with ozone, or the like. If the contact time is long, the microorganisms are inhibited at a low ozone concentration. For example, nitrification activity is maintained to about 20 mg $O_3$/gSS for a short time contact in batch treatment using activated sludge, whereas in continuous treatment using microorganisms obtained by ozone acclimatization and preferential breeding of the activated sludge, there is little influence to about 6 mg $O_3$/gSS. Therefore, the level of the ozone concentration that inhibits microorganisms is set by investigating ozone resistance in the microorganisms to be used in advance.

When the ozone amount in wastewater is higher than or equal to the level that inhibits microorganisms, it is necessary to lower the mixed amount of ozone. As the adjusting device for adjusting the mixed amount of ozone, a measuring device for measuring the amount of ozone in the wastewater discharged from the ozone oxidation unit, and a regulating valve capable of regulating the amount of ozone which is supplied from the ozone generator to the mixer and mixed with the wastewater are provided. The regulating valve is controlled so that the amount of ozone to be mixed with the wastewater is reduced based on the measured value of the ozone amount in the wastewater by the measuring device. At this time, if the mixing ratio of ozone in the mixer is reduced corresponding to the difference in ozone concentration between the measured value of the ozone amount in the wastewater and the level inhibiting the microorganisms, the mixing ratio of ozone in the mixer can efficiently approximate an appropriate value and the time required for the adjustment can be shortened.

Figure 4:
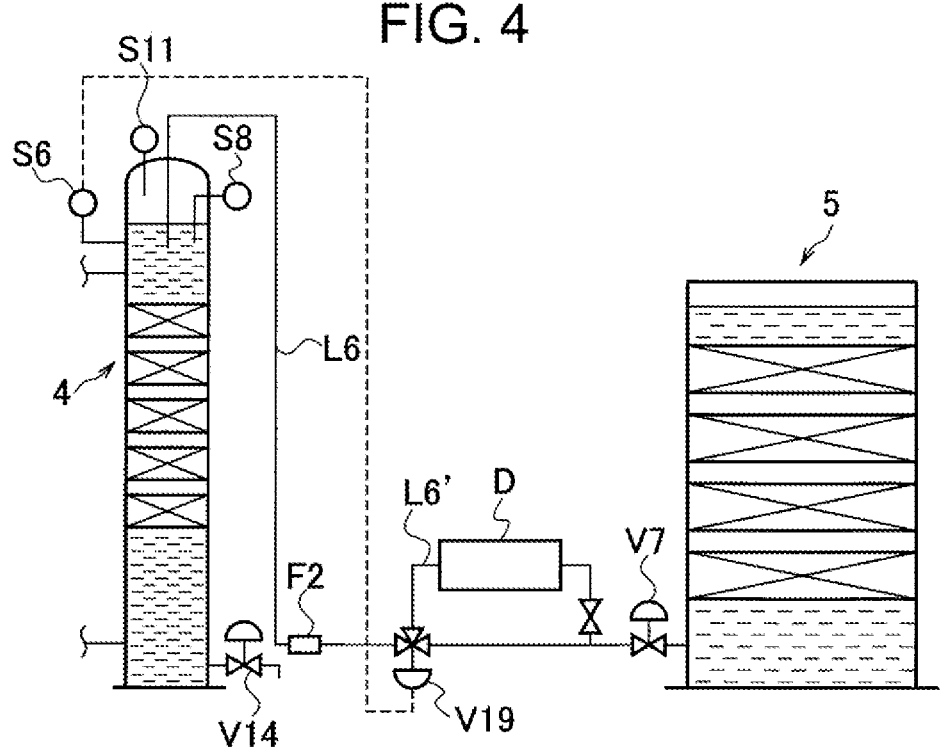
FIG. 4 is a schematic diagram showing a modified example of a part of the wastewater treatment device according to the present disclosure.
Figure 5:
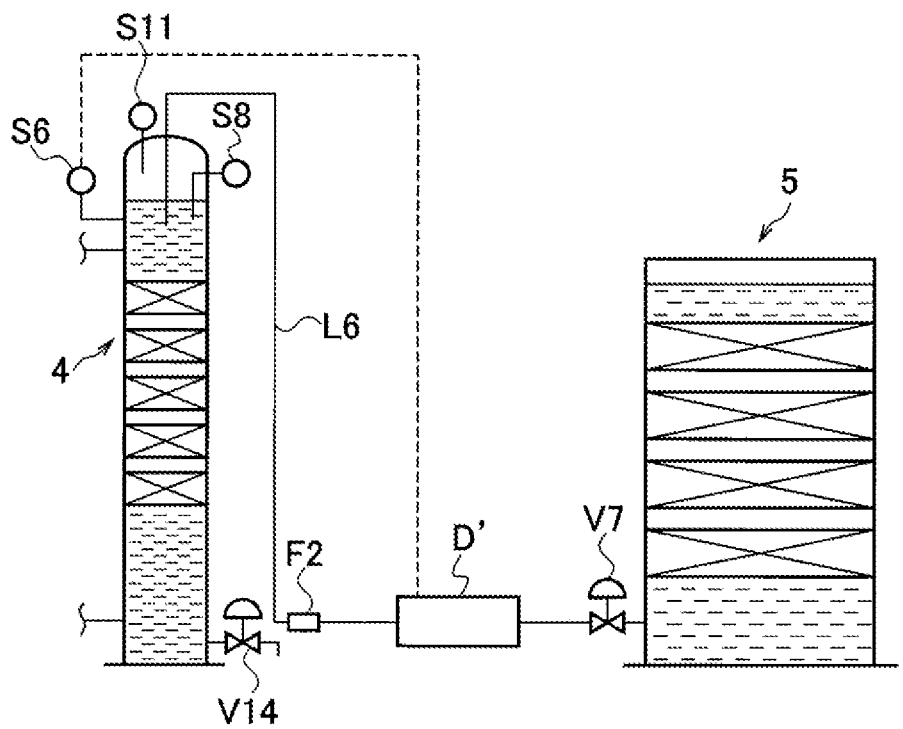
FIG. 5 is a schematic diagram showing another modified example of a part of the wastewater treatment device according to the present disclosure.

In the case of avoiding the supply of wastewater to the biological treatment unit, the control to suppress the supply of wastewater to the biological treatment can be made by using a control valve which can stop the supply of wastewater according to the situations of the wastewater after subjecting to the ozone oxidation treatment. Specifically, the ozone amount in the wastewater discharged from the ozone oxidation unit is measured using the measuring device, and, based on the measured value, the supply of wastewater to the biological treatment unit is stopped by the control valve when the ozone amount in the wastewater is higher than or equal to the level that inhibits microorganisms. The ozone dissolved in the wastewater is decomposed in a relatively short time, but even a small amount of ozone may inhibit microorganisms. Thus, in the conventional wastewater treatment technology, bubbling or the like is used, which promotes the release of ozone to the atmosphere. In the present disclosure, the supply to the biological treatment may be avoided only when the concentration of ozone in the wastewater is at the level that inhibits microorganisms. For the wastewater which is not supplied to the biological treatment, the supply destination of the wastewater is switched, and thus the wastewater can be supplied by the return passage to the mixer directly or indirectly via the wastewater source. The returned wastewater is prepared again as the ozone mixed wastewater, and the ozone oxidation treatment is repeated. In the supply switching of the wastewater, it is suitable to provide an on-off valve that can intermittently direct the flow between the ozone oxidation unit and the biological treatment unit, and to operate it synchronously so that the supply of wastewater is stopped when the on-off valve is closed. Alternatively, the release passage (return passage) may be configured to be branched from a flow channel through which the wastewater is discharged from the ozone oxidation unit, and a direction control valve is provided at a branch point to switch the flow channel that communicates. As a modified example, the release passage branched from the flow channel through which the wastewater is discharged from the ozone oxidation unit can be configured as a bypass path L6' and thus an ozone decomposing device D can be provided on the bypass path (see FIG. 4). The wastewater discharged from the ozone oxidation unit is temporarily prevented from being supplied to the biological treatment unit by a switching valve V19 and the ozone remaining in the wastewater is decomposed by the ozone decomposing device. This wastewater can be supplied to the biological treatment unit. The ozone decomposing device may be according to any of methods such as adsorption decomposition method, heating decomposition method, catalytic decomposition method using alumina, silica or the like. In the case of using an ozone decomposing apparatus D' according to the heating decomposition method, the ozone decomposing apparatus D' may be configured to be provided on the channel L6 as shown in FIG. 5 to perform the decomposition by detecting ozone using an ozone meter S6.

In the ozone oxidation of the wastewater, as the amount of organic pollutants is increased, the amount of ozone required for ozone oxidation is increased. However, excessive ozone increases the residual ozone amount of the wastewater after the ozone oxidation, and also decreases the ozone utilization efficiency in the ozone oxidation. In the evaluation using COD (chemical oxygen demand) as an index of organic pollutant concentration, when ozone is mixed with wastewater so that the ozone/COD ratio is about 0.67 or less, the ozone utilization efficiency of about 97.5% or more can be achieved and the amount of ozone remaining in the wastewater after the ozone oxidation also decreases. Therefore, the mixing ratio of ozone into wastewater is appropriately adjusted according to the COD of the wastewater to be treated, and the ozone/COD ratio may be set to be about 0.67 mg/mg or less, preferably about 0.50 mg/mg or less.

However, if ozone to be mixed is insufficient, though the ozone utilization efficiency is high, persistent organic pollutants are not sufficiently decomposed and the burden of microorganisms in subsequent biological treatment is likely to be increased. As a result, the optimum mixing ratio of ozone is generally set to a ratio such that the ozone/COD ratio is around 0.40 mg/mg. In order to set the optimum mixing ratio more precisely, a ratio at which the ozone/COD ratio is somewhat higher, for example, a mixing ratio at which the ozone/COD ratio is somewhat larger than 0.4 mg/mg is set as an initial value to try the wastewater treatment, and the mixing ratio of ozone may be lowered gradually or stepwise so that the concentration of ozone remaining in the wastewater after the ozone oxidation is lowered from a value higher than or equal to the level of inhibiting microorganisms to a value lower than that level. Alternatively, with gradually increasing the mixing ratio of ozone from a low value, the mixing ratio may be determined, at the stage when the residual ozone is detected, to such a ratio that the residual ozone concentration becomes less than the level inhibiting microorganisms.

The appropriate mixing ratio of ozone possibly changes depending on the ratio of persistent organic substances occupied in the organic pollutants in wastewater. Basically, at least persistent organic substances in the wastewater may be decomposed in the ozone oxidation treatment. In this respect, the mixing ratio of ozone may be generally set so that the ozone/COD ratio is in a range of about 3 mg/mg or less, and wastewater whose COD is excessively high may be diluted in advance with treated wastewater or the like as necessary. Therefore, in a simple manner, the supply flow rate of ozone may be adjusted, depending on the water quality (for example, COD) of the wastewater and the flow rate of the wastewater supplied to the ozone oxidation treatment, so that the mixing ratio of ozone falls within the above-described appropriate range. In wastewater that is subjected to the ozone oxidation at the appropriate mixing ratio, persistent organic substances are satisfactorily decomposed and thus the burden of microorganisms in the subsequent biological treatment is reduced, so that the microorganisms in the biological treatment well consumes easily decomposable organic substances. By the ozone oxidation, the decomposition and removal of the organic pollutants can generally be achieved at a removal rate of about 20 to 30% in terms of COD.

Ozone can be mixed with wastewater using a common gas-liquid mixer. In order to promote dissolution of ozone, subdivision and pressurized supply are effective. Therefore, in preparing the ozone mixed wastewater, it is preferable to bubble ozone using a bubble generator and to disperse the ozone in wastewater in the form of fine bubbles. The bubbling of ozone can be carried out by a mixer which mixes gas with a liquid by a gas-liquid shearing method, a foaming device which ejects gas into a liquid from a minute ejection orifice, and an inline mixer (static mixer) which directly introduces gas into a flowing liquid, and the like. It may be appropriately selected and used from the instruments or devices as described above. From the viewpoint of the reaction control and the precision management, it is suitable that there are few variations in the size of bubbles. Further, when the bubbles are small, the gas-liquid contact area per volume becomes large, and thus ozone becomes easy to dissolve in water. At the same time, the floating speed of bubbles is small and thus a residence time in water can be increased. Therefore, it is easy to increase the utilization efficiency of ozone. For this reason, it is convenient to use the microbubble generator as the mixer. Microbubbles usually mean fine bubbles having a diameter of about 10 to 50 m. As described above, the microbubbles can significantly improve the gas-liquid mass transfer rate and transfer efficiency. Therefore, the supply of ozone using the microbubble generator can improve the mass transfer and utilization efficiency of ozone in the ozone oxidation treatment, and can greatly improve its effectiveness.

Since ozone easily reacts with organic compounds having a double bond, an activated aromatic group, an amino group, a sulfur-containing group or the like and generates hydroxy radicals by the reaction, the ozone oxidation relatively easily proceeds in industrial wastewater. However, in order to efficiently progress the wastewater treatment, it is preferable to promote the ozone oxidation reaction. The ozone oxidation is promoted by addition of hydrogen peroxide, ultraviolet irradiation, or coexistence of a catalyst, whereby hydroxyl radicals or ozonide ions generated from ozone contribute to the acceleration of oxidation. Therefore, if the promoting means as described above is used in the ozone oxidation treatment, the treatment efficiency can be improved and the treatment time can be shortened, which is useful for advanced treatment of industrial wastewater. In particular, the use of the catalyst is effective to reduce the treatment cost in long-term continuation of wastewater treatment. There are a homogeneous catalyst and a heterogeneous catalyst as the catalyst. When the heterogeneous catalyst is used, it is easy to separate the catalyst which is in contact with wastewater. For the above-mentioned reason, it is advantageous to install a catalyst bed carrying the heterogeneous catalyst in the ozone oxidation unit.

Examples of the heterogeneous catalysts for the ozone oxidation include metal oxides, metal-supported oxides, platinum group metals, zeolites, activated carbon, and the like. Examples of the metal oxides include $Fe_2O_3$, $CoO$, $MoO_3$, $MnO_2$, $SiO_2$, $Al_2O_3$, $TiO_2$, and the like, and examples of the metal-supported oxide include those in which a metal such as Co, Cu, Pb, Ru, Pt, Pd and the like is supported on an oxide such as silica gel, titania and the like.

When the ozone is consumed by the ozone oxidation reaction, oxygen is generated, and the oxygen, having high water solubility, is contained in the wastewater as dissolved oxygen. That is, as the ozone utilization efficiency improves, the concentration of dissolved oxygen in wastewater to be supplied to the biological treatment unit is increased, so that the aerobic treatment by microorganisms can proceed without aeration to wastewater. In the present disclosure, a control mechanism is provided for suppressing the supply of wastewater to the biological treatment when ozone that inhibits microorganisms remains in the wastewater after the ozone oxidation treatment. Therefore, it is possible to increase the concentration of dissolved oxygen in wastewater supplied to the biological treatment by supplying the maximum amount of ozone to the extent that microorganisms for the biological treatment are not inhibited. This advantage is further enhanced by the supply of ozone as microbubbles and the use of a catalyst promoting the ozone oxidation. In the technology of the present disclosure, wastewater having a concentration of dissolved oxygen (DO) of about 20 mg/L or more can be supplied to the biological treatment as wastewater after the ozone oxidation treatment. This is sufficiently larger than the concentration (about 8 mg/L at maximum) obtained by ordinary aeration. Therefore, since the aeration is unnecessary in the biological treatment, energy consumption accompanying the aeration can be eliminated and the cost of wastewater treatment can be reduced. In addition, with supplying a high concentration of oxygen, it is possible to increase a filling amount of aerobic microorganisms for the biological treatment and increase the treatment efficiency, which is also advantageous in this respect.

The biological treatment can proceed using the aerobic microorganisms commonly used for the biological treatment of organic wastewater, and examples of the aerobic microorganisms include aerobic microorganisms constituting activated sludge. Using oxygen generated from ozone, the aerobic treatment can be performed in wastewater without performing the aeration. By the aerobic treatment, a nitrogen component such as amines is converted into ammonia nitrogen and nitrate nitrogen, a carbon component is converted into carbon dioxide and water, and a sulfur component is converted into sulfate. In a treatment according to the activated sludge method, anaerobic biological treatment proceeds in anoxic state after the aerobic biological treatment. Where the microorganisms used for the biological treatment contain similar anaerobic microorganisms (or microorganisms having both aerobic and anaerobic properties), aerobic treatment and anaerobic treatment can be carried out. In that case, nitrate nitrogen is converted to nitrogen gas.

From the viewpoint of continuously treating the wastewater, treatment using a biofilm is carried out in the biological treatment, in order to efficiently perform the contact and separation between the wastewater and the microorganisms. The biofilm is formed by carrying microorganisms on a carrier according to methods such as a rotating biological contact method, a trickling filter method, a catalytic oxidation method, an aerobic filter bed method, and the like. Using a porous body, a fiber material or the like as a carrier, the biological bed to be used can be formed by using the carrier and having microorganisms formed on the surface thereof. It is efficient to construct a biological treatment unit in a multistage structure composed of a plurality of biological beds. The biological bed (biological filter) formed in a filter shape using a layered fiber material as the carrier can be handled conveniently.

In this way, by combining the ozone oxidation treatment with the biological treatment, the supply of wastewater after the ozone oxidation treatment is controlled so that the microorganisms in the biological treatment are not inhibited, whereby the industrial wastewater is possibly treated stably and continuously. The ozone utilization rate in the ozone oxidation is high, and the persistent organic substances can be efficiently decomposed by using the oxidation ability of ozone. And the biological treatment can efficiently proceed by utilizing the high-concentration oxygen generated from ozone.

An embodiment of a wastewater treatment device capable of carrying out the wastewater treatment as described above will be described below with reference to the drawings. A wastewater treatment device 10 shown in FIG. 2 includes an ozone generator 1, a microbubble generator 2, a suction pump 3, an ozone oxidation unit 4, and a biological treatment unit 5. In this embodiment, the microbubble generator 2 is adopted as the mixer, but it is not limited to this adoption, and a common gas-liquid mixer may be used. The ozone oxidation unit 4 is configured as an airtight pressure vessel and has a plurality of catalyst beds C in which a heterogeneous catalyst for ozone oxidation reaction is supported, and it has a multistage structure in which the plurality of catalyst beds C are stacked in the vertical direction. Inside the biological treatment unit 5, a biological bed B having a biofilm on its surface is disposed. Wastewater W is stored in a wastewater tank 6 (wastewater source), and treated water W' discharged from the biological treatment unit 5 is stored in a post-treatment water tank 7.

The ozone generator 1 is connected to the microbubble generator 2 through a flow channel L1, and the microbubble generator 2 is connected to the suction pump 3 through flow channels L2, L3, and L4, and further connected to a bottom inlet of the ozone oxidation unit 4 through a flow channel L5. An upper end of the ozone oxidation unit 4 is connected to the bottom part of the biological treatment unit 5 by a flow channel L6.

The ozone generator 1 generates ozone, using pure oxygen as a raw material, and the ozone is introduced into the microbubble generator 2 through the flow channel L1. At the same time, the wastewater W pumped from the flow channel L2 by the driving of the suction pump 3 is also supplied to the microbubble generator 2 through the flow channel L3 and L4 and mixed with ozone. In the microbubble generator 2, the ozone mixed wastewater in which ozone is dispersed in a state of microbubbles is prepared. The ozone mixed wastewater flows into the ozone oxidation unit 4 from the bottom inlet through the flow channel L5. In addition, a flow channel L7 is provided to communicate a space above the catalyst bed C in the ozone oxidation unit 4 with the flow channel L4, and such a configuration in which wastewater can return from the ozone oxidation unit 4 to the microbubble generator 2 through the flow channel L7 is formed. In other words, the flow channel L7 functions as a return passage through which wastewater directly returns from the ozone oxidation unit 4 to the microbubble generator 2.

A flow rate control valve V1 capable of adjusting a flow rate of the wastewater W, a filter F1 for filtering the wastewater W, a flow meter S1 for detecting the flow rate of the wastewater W, and a one-way valve V2 for preventing a backflow of the wastewater W are provided on the flow channel L2. The flow rate control valve V1 is electrically connected to the flow meter S1 and is configured so that the flow rate in the flow channel L2 can be adjusted to a desired flow rate based on the flow rate detected by the flow meter S1. A flow rate control valve V3, a flow meter S2, a pressure sensor S3, and a one-way valve V4 for preventing backflow are provided on the flow channel L1. The flow rate control valve V3 is electrically connected to the flow meter S2 and is configured so that the flow rate of ozone in the flow channel L1 can be adjusted based on the flow rate detected by the flow meter S2. In addition, a flow rate control valve V5 and a flow meter S4 are provided on the flow channel L3 and are electrically connected to each other so that the flow rate of the wastewater W supplied from the wastewater tank 6 to the microbubble generator 2 is adjusted by the flow rate control valve V5, based on the flow rate detected by the flow meter S4. A filter F3, an on-off valve V17, and a flow meter S4' are provided on the flow channel L4, and the flow rate of the flow channel L4 can be monitored by the flow meter S4'. A flow meter S5 and an on-off valve V6 are provided on the flow channel L5. An on-off valve V7 and a filter F2 are provided on the flow channel L6 and are configured to be able to switch the supply and stop of wastewater from the ozone oxidation unit 4 to the biological treatment unit 5. In addition, an on-off valve V8 and a one-way valve V12 are provided on the flow channel L7 and are configured to be able to switch the return and shutoff of wastewater from the ozone oxidation unit 4 to the microbubble generator 2. In addition, an on-off valve V9 is provided on the flow channel L3, and the supply of the wastewater W to the microbubble generator 2 can be controlled by the on-off valve V9.

In the above configuration, when the ozone generator 1 and the microbubble generator 2 are operated while the on-off valves V6, V9, and V17 are opened to drive the suction pump 3, the wastewater W and ozone are supplied to the microbubble generator 2 at flow rates in accordance with the mixing ratio of the initial setting and the ozone mixed wastewater is introduced into the bottom inlet of the ozone oxidation unit 4. The supplied ozone mixed wastewater rises from a bottom part toward a top part of the ozone oxidation unit 4, and sequentially passes through a plurality of catalyst beds C in the meantime, thereby the ozone oxidation is promoted by the contact with the catalyst. The wastewater in the ozone oxidation unit 4 can be discharged through the flow channel L6 or the flow channel L7 under pressure. The pressure inside the ozone oxidation unit 4 is monitored by a pressure sensor S11 provided at the top.

As a measuring device which measures the amount of ozone in the wastewater that has passed through the catalyst bed C, an ozone meter S6 is provided above the catalyst bed C in the ozone oxidation unit 4 to detect the residual ozone. The ozone meter S6 is electrically connected to the on-off valves V7 and V9. When the remaining amount of ozone in the wastewater to be detected is at the level that inhibits microorganisms in the biological treatment unit 5, the on-off valves V7 and V9 are closed to make the wastewater return from the ozone oxidation unit 4 to the microbubble generator 2 and circulate between the microbubble generator 2 and the ozone oxidation unit 4. At the same time, the flow rate control valve V3 of the flow channel L1 is controlled so that the flow rate of ozone supplied to the microbubble generator 2 is reduced. In other words, the ozone meter S6 and the flow rate control valve V3 configure an adjusting device to adjust the amount of ozone to be mixed with the wastewater, and the mixing ratio of ozone is adjusted so that ozone in an amount that inhibits the microorganisms does not remain in the wastewater after the ozone oxidation. The change amount in the flow rate of ozone under the control of the flow rate control valve V3 may be reduced in accordance with the difference between the detection value of the ozone meter S6 and the level value, or may be a constant flow rate that is reduced stepwise. It is noted that the mixing ratio of ozone to wastewater can also be adjusted by changing a generation rate of ozone in the ozone generator 1 or a supply rate of oxygen as a raw material. Therefore, the above-described adjusting device may be configured by using a signal control of the ozone generator or a regulating valve for regulating a supply flow rate of an oxygen source, instead of using the flow rate control valve V3. In the case where the remaining amount of ozone detected by the ozone meter S6 is less than the level that inhibits microorganisms, the on-off valves V7 and V9 are opened. As a result, depending on the amount of wastewater supplied from the wastewater tank 6, the wastewater is discharged from the ozone oxidation unit 4 and is supplied from the ozone oxidation unit 4 to the bottom part of the biological treatment unit 5. Accordingly, if the water quality of wastewater is not changed, this state becomes a steady state, and the ozone oxidation treatment and the biological treatment of the wastewater are stably continued. Ozone in an amount that inhibits microorganisms does not remain in the wastewater discharged from the ozone oxidation unit 4. The ozone meter S6 in FIG. 2 measures the dissolved ozone in the wastewater, but it may be an ozone meter that measures the ozone concentration of the gas phase on the wastewater. Then it is possible to convert from the ozone concentration of gas phase to ozone concentration in the wastewater.

The wastewater supplied to the biological treatment unit 5 rises from the bottom part toward the top part of the biological treatment unit 5, and passes through the biological beds B in the meantime. Since the wastewater supplied to the biological treatment unit 5 contains high-concentration dissolved oxygen, the aerobic reaction by microorganisms proceeds. Oxygen is consumed as the treatment proceeds. Therefore, in the case where the microorganisms used in the biological treatment unit 5 contain anaerobic microorganisms, if oxygen is exhausted, the reaction of the microorganisms is switched to the anaerobic reaction. In this case, the aerobic biological treatment always proceeds in the lower part of the biological bed, whereas the anaerobic biological treatment can proceed according to poor oxygenation in the upper part of the biological bed. After the biological treatment, the treated water W' is discharged from the upper end of the biological treatment unit 5 to the post-treatment water tank 7 through the flow channel L8.

The wastewater treatment device 10 further has a flow channel L9 which connects the post-treatment water tank 7 to the flow channels L3 and L4, and a pump 8, a flow rate control valve V10, a filter F4, a flow meter S7, and a one-way valve V11 are provided on the flow channel L9, so that the treated water W' of the post-treatment water tank 7 possibly returns to the microbubble generator 2 through the flow channel L9 and the flow channels L3 and L4. The flow rate control valve V10 is electrically connected to the flow meter S7 and controlled based on the flow rate detected by the flow meter S4, and the flow rate of the treated water W' supplied to the microbubble generator 2 can be adjusted by a flow rate control valve V5. In the case where the concentration of organic pollutants in the wastewater W is extremely high and there is a risk of interfering with the biological treatment, the wastewater W can be appropriately diluted using the treated water W', so that the ozone oxidation treatment and the biological treatment can be carried out without interference. It is appropriate to determine whether or not to perform the return of the treated water W' based on the COD measurement value of the wastewater W. In addition, a branching path which is branched from the flow channel L8 to supply the wastewater to the wastewater tank 6 may be provided so that the wastewater can be treated again when the COD measurement value of wastewater after the biological treatment does not satisfy the drainage standard.

Since the heights of the biological treatment unit 5 and the ozone oxidation unit 4 are different from each other and the water level in the biological treatment unit 5 is lower than the water level in the ozone oxidation unit 4, it is possible to supply the wastewater of the ozone oxidation unit 4 to the biological treatment unit 5 by using the gravity action due to the difference in height of the water level without using the power of the pump or the like. A water level gauge S8 for detecting a liquid level is provided on the upper part of the ozone oxidation unit 4 for the management such that the liquid level of the wastewater in the ozone oxidation unit 4 is maintained at a constant level when the wastewater is discharged from the ozone oxidation unit 4.

Water level gauges S9 and S10 are installed in the wastewater tank 6 and the post-treatment water tank 7, respectively. The introduction of the wastewater W into the wastewater tank 6 and the discharge of the treated water W' from the post-treatment water tank 7 are managed based on the detection of the water level gauges S9 and S10, and the replenishment of the wastewater W and the discharge of the treated water W' are appropriately performed to maintain the water level. On-off valves V13, V14, V15, V16, V17 and V18 are installed in order to drain water from each of the flow channels of the device and each of the ozone oxidation unit 4 and the biological treatment unit 5. These on-off valves are opened after the wastewater treatment, which enables, if necessary, to inspect and repair the device. These on-off valves are closed at the start of the treatment.

In the wastewater treatment device described above, ozone is supplied in the form of microbubbles, such that the gas-liquid mass transfer of ozone is improved and the rate of decomposition and reaction is improved. Moreover, since the time for ozone to stay in the wastewater is long, the ozone utilization efficiency is remarkably high, and the gas phase ozone which is unused and released outside the wastewater is reduced. In addition, hydroxy free radicals are generated by ozone oxidation using a catalyst, and the persistent organic pollutants are easily decomposed, so that biodegradability of the wastewater is improved. Furthermore, the reactivity of ozone is improved, so that the concentration of dissolved oxygen in wastewater is increased and the efficiency of aerobic treatment in the biological treatment is improved.

Since ozone is generated by irradiation of ultraviolet rays or electric discharge to oxygen, the ozone generator 1 is possibly configured using a commercially available oxygen generating device. The oxygen generating device is a device based on a concentration method such as those of adsorptive separation (PSA) type, oxygen enriched membrane type and cryogenic separation type, and any type of oxygen generating device may be used. In the oxygen generating device, oxygen which is separated and concentrated from air is used as a raw material of ozone. The amount of ozone supplied from the ozone generator 1 can be adjusted by changing the amount of oxygen which is generated from the ozone generating device. The generation amount of ozone (that is, the supply amount of ozone) can be determined according to the water amount and the water quality of the wastewater to be treated. Alternatively, instead of the oxygen generating device, ozone may be generated by using oxygen stored in a liquid oxygen tank, a curdle in which oxygen cylinders are collected, or the like as an oxygen supply source.

The microbubble generator 2 is a gas-liquid mixer employing an OHR gas-liquid mixing manifold technology, and has an advantage that it is suitable for large-scale applications. By controlling the gas/water volume ratio to 1/10 and setting a pre-tube pressure higher than 0.3 MPa, it is possible to stably generate microbubbles having a diameter less than 50 μm. The microbubble generator 2 may be replaced with another mixer such as another bubble generator, an inline mixer, etc.

The ozone oxidation unit 4 is configured of an airtight pressure resistant container having an operating pressure of less than 0.05 MPa, and the inside of the ozone oxidation unit 4 is subjected to anticorrosion treatment. In the above embodiment, an ozone oxidation catalyst is used, and a catalyst bed C having a multistage structure in which particulate ozone oxidation catalyst is filled in each stage is disposed in the tank. The ozone oxidation catalyst can be appropriately selected from various available particulate heterogeneous catalysts and used, and conditions such as the charged amount of the catalyst and the bed height can be determined according to the ozone oxidation catalyst used.

The treatment time in the ozone oxidation unit 4 is set according to the water quality of wastewater and is generally within one hour. The BOD/COD value of wastewater is increased (BOD: biochemical oxygen demand) due to the reduction of persistent organic substances by the ozone oxidation treatment, and the BOD/COD value in the treated wastewater exceeds 0.3 while the concentration of dissolved oxygen exceeds 20 mg/L. Wastewater (wastewater/air mixture) that has undergone the ozone oxidation is introduced into the bottom part of the biological treatment unit 5 due to the liquid level difference, and no power is used.

In the above embodiment, a biofilter reactor is used as the biological treatment unit 5, and a biological bed B having a multistage structure is configured by a filter-like carrier having a biofilm formed on the surface thereof, but it is not limited to this configuration. A constituent material of the carrier may be any material as long as it does not inhibit the activity of microorganisms for the biological treatment and it may include activated carbon, ceramics, minerals, various animal fibers and plant fibers such as wool, various chemical fibers, and the like. Examples of minerals may include vermiculite, perlite, zeolite, and the like. Also, mold sand such as gravel, lava sand, chromite sand and zircon sand, etc., and mullite-based artificial sand (alumina-silica composite ceramic) which is the alternative artificial sand, and the like can be used. The biological bed can be configured by using a particulate carrier as a filler, or a fibrous material as forming a layered filter. As for the material that can be molded and processed, it can be used in any form by processing. The biological bed B may be formed so that porosity is larger than 0.4. The treatment time (residence time of wastewater) in the biological treatment unit 5 can generally be set to be 3 hours or longer. However, the setting of the treatment time can be shortened in accordance with the COD value of the wastewater, the capacity of the treatment unit, and the like. The aeration is unnecessary, and the treated water is discharged as overflowing water from the top part. The activated sludge, which is microorganisms for general wastewater treatment, undergoes both of the aerobic treatment and the anaerobic treatment depending on the treatment conditions. Therefore, when the biological bed B is constructed using such a microorganism group, similarly, the aerobic treatment and the anaerobic treatment can continuously proceed due to the exhaustion of oxygen concentration. In this regard, if the biological treatment unit 5 is divided into two parts for aerobic treatment and anaerobic treatment, and if microorganisms specialized for each treatment are used in each part, the efficiency of the biological treatment can be improved. In particular, the efficiency of the aerobic treatment can be improved by taking advantage of the high-concentration dissolved oxygen in the wastewater discharged from the ozone oxidation unit 4. For this purpose, it is appropriate to determine the constitution distribution of the biological bed B by investigating the consumption trend of dissolved oxygen in the biological treatment unit 5 in advance.

In this way, the ozone utilization efficiency in the ozone oxidation unit 4 can be increased to 99% or more, and the unused residual ozone can be substantially reduced to zero. Also, since wastewater containing the residual ozone can be prevented from affecting microorganisms by restricting the supply to the biological treatment unit, gas treatment for ozone gas or the like is unnecessary. As the decomposition of the persistent organic substances proceeds and the burden on the biological treatment is reduced, the removal rate of organic pollutants can be achieved at least 30% or more to 50% or less based on COD. It is possible to provide a wastewater treatment device which does not use a power source in the operation of the biological treatment unit and does not substantially require a power cost.

Figure 2:
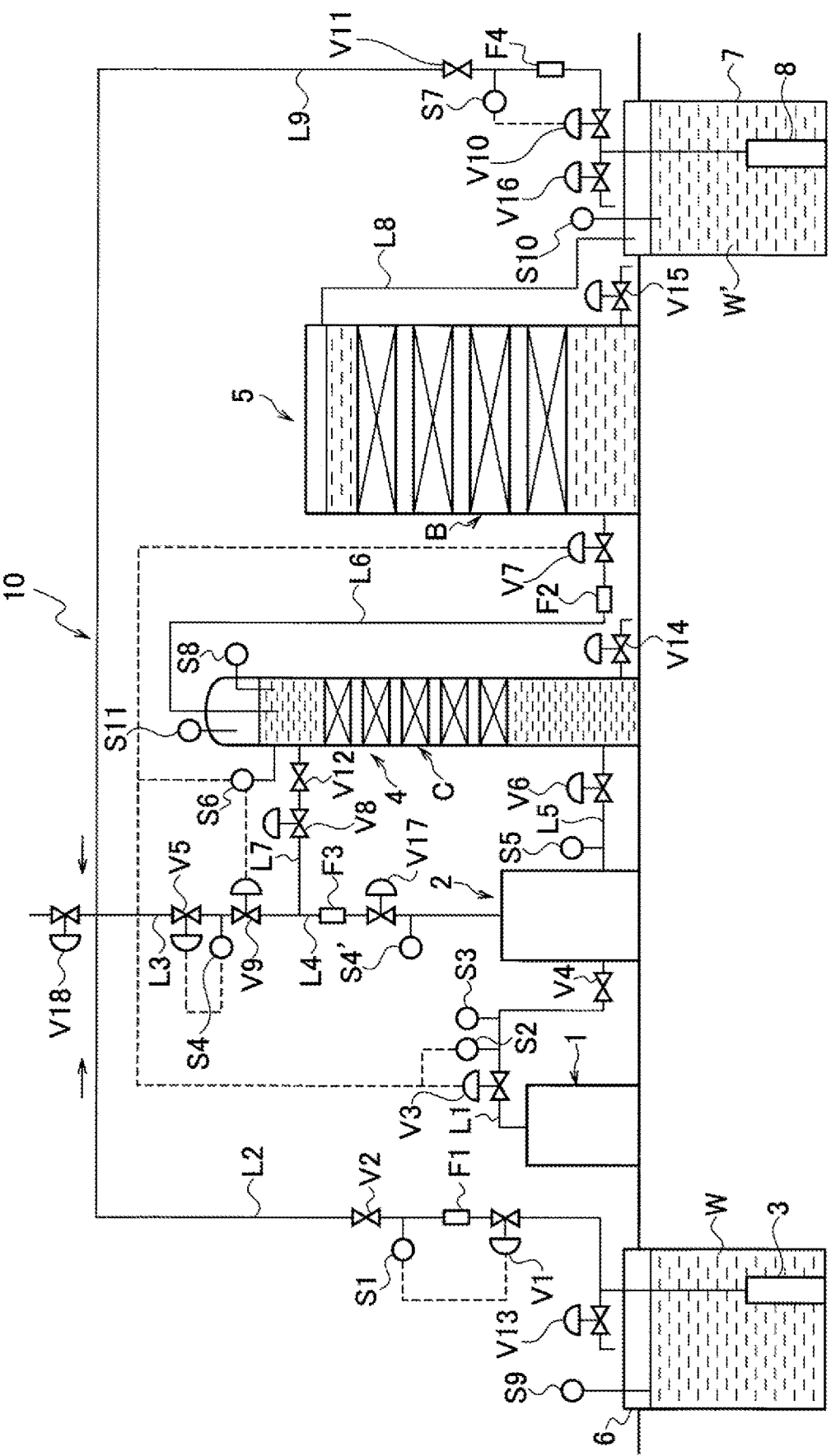
FIG. 2 is a schematic configuration diagram showing an embodiment of the wastewater treatment device based on the basic configuration of FIG. 1.
Figure 3:
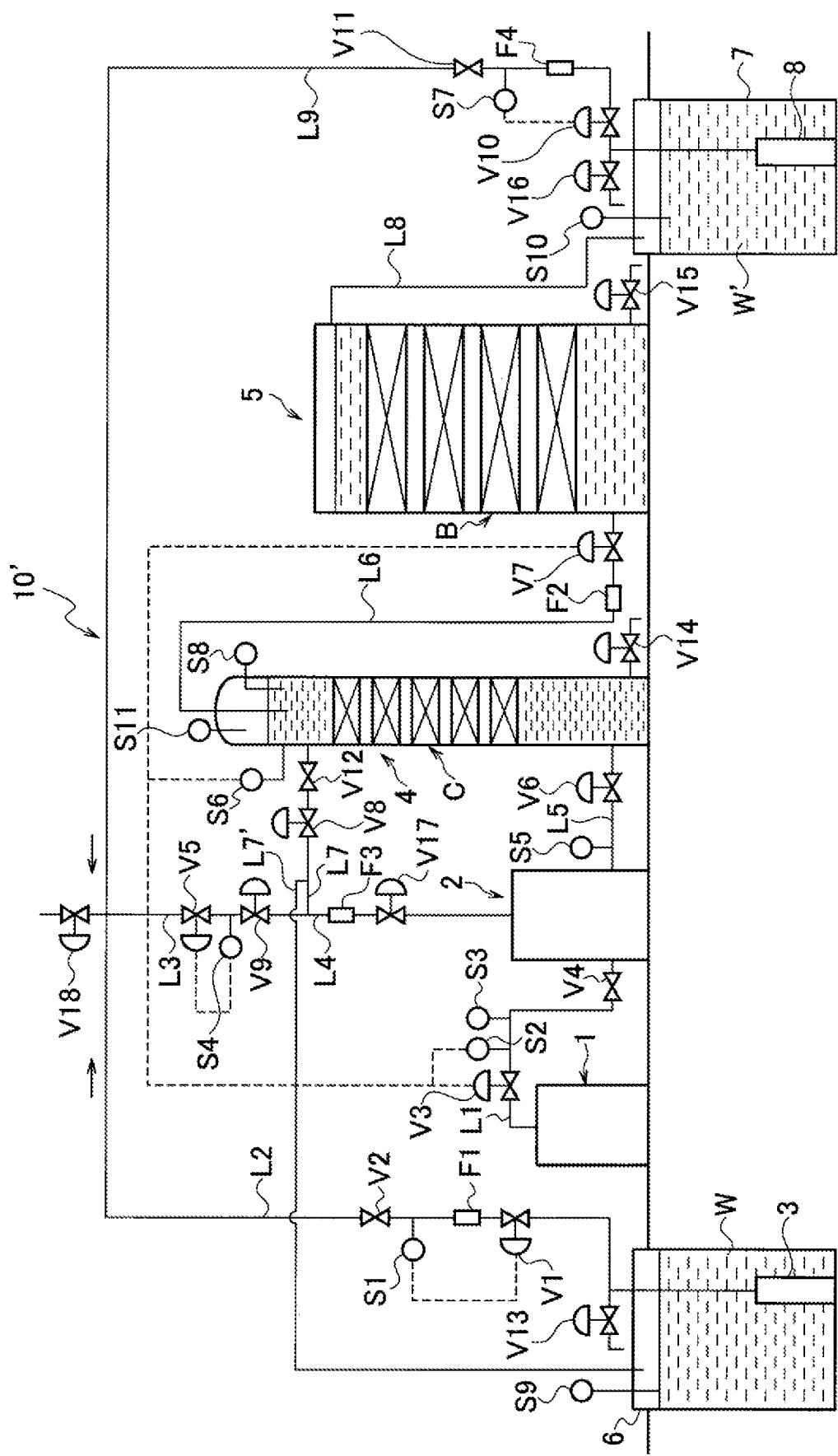
FIG. 3 is a schematic configuration diagram showing another embodiment of the wastewater treatment device.

FIG. 3 shows another embodiment of the wastewater treatment device. A wastewater treatment device 10' of FIG. 3 is configured to include a release passage as a flow channel L7' through which the wastewater discharged from the ozone oxidation unit 4 returns to the wastewater tank 6 (wastewater source). In this configuration, since the flow rates of the flow channel L3 and the flow channel L4 are the same, a flow meter S4' of the flow channel L4 is omitted. Since the wastewater treatment device is configured in the same manner as in FIG. 2 except for the above points, a description thereof is omitted.

Also in the wastewater treatment device 10' of FIG. 3, the microorganisms of the biological treatment can be protected from residual ozone by utilizing the release passage according to the situation of the wastewater after the ozone oxidation treatment. In the adjustment of the amount of ozone to be mixed with wastewater by using the regulating device, if ozone remains in the wastewater discharged from the ozone oxidation unit 4, the supply of wastewater to the biological treatment unit 5 is avoided by using the flow channels L7 and L7'. The wastewater flowing through the flow channel L7' is supplied to the wastewater tank 6 and indirectly supplied to the microbubble generator 2 via the wastewater tank 6 (wastewater source), to be mixed with ozone. In the meantime, the mixing amount of ozone is optimized, and the wastewater discharged from the ozone oxidation unit 4 is supplied to the biological treatment unit 5. In the supply control of wastewater in this embodiment, the wastewater in the wastewater tank 6 is always supplied to the microbubble generator 2. While wastewater circulates the microbubble generator 2 and the ozone oxidation unit 4, the supply destination of the wastewater discharged from the ozone oxidation unit 4 in an amount corresponding to the amount of the wastewater supplied from the wastewater tank 6 is switched to either of the wastewater tank 6 or the biological treatment unit 5 in accordance with the residual amount of ozone. Therefore, an on-off valve V9 of the flow channel L3 is not involved in this switching.

In FIG. 2 and FIG. 3, the supply control of wastewater by switching the on-off valve is configured so as to be automatically executable by the electrical connection between the on-off valve and the flow meter or the sensor. However, of course, it is also possible to control the supply of the wastewater based on manual switching. When the water quality of wastewater is stable, it is not necessary to perform the supply control of wastewater after determining the treatment conditions in the wastewater treatment device.

EXAMPLES

Treatment Example E1

As a result of examining the water quality of wastewater discharged from a chemical company, it was found that the COD concentration was about 300 mg/L, the BOD/COD value was about 0.04, and the biodegradability was extremely low. For this wastewater, the following treatment was carried out using the wastewater treatment device as shown in FIG. 1. The catalyst bed arranged in the ozone oxidation unit was composed of activated carbon and the biological bed of the biological treatment unit 5 was configured of a biofilter having a biofilm of aerobic microorganisms formed on the surface thereof.

The volume ratio of gas/water in the microbubble generator was set to 1/10 and microbubbles were generated at a pre-tube pressure of 0.3 MPa or more, whereby wastewater in which ozone bubbles having a diameter of 50 µm or less were dispersed was stably prepared and supplied to the ozone oxidation unit (ozone/COD=2.6 mg/mg). As a result of setting the residence time of wastewater in the ozone oxidation unit to be one hour and examining the water quality of the wastewater passing through the catalyst bed, the COD was reduced to about 200 mg/L, the BOD/COD was increased to 0.30, and the concentration of dissolved oxygen exceeded 23 mg/L. The COD load removal was 1.46 kg/($m^3 \cdot d$). The ozone concentration of wastewater was about 2.5 mg/L, and the ozone utilization rate exceeded 95%.

This wastewater was introduced into the biological treatment unit as it was, and after about 6 hours, the treated water overflowed from the biological treatment unit. As a result of examining the water quality of the treated water, the concentration of dissolved oxygen was 10 mg/L or more, and the COD concentration of the effluent treated water was stable and less than 100 mg/L.

Treatment Example E2

Using the device of FIG. 2, wastewater having a COD of 137 mg/L was subjected to the following wastewater treatment. The catalyst bed arranged in the ozone oxidation unit was composed of activated carbon and the biological bed of the biological treatment unit 5 was configured of a biofilter having a biofilm of aerobic microorganisms formed on the surface thereof.

Wastewater and ozone were supplied to the microbubble generator 2 at a mixing ratio of ozone and wastewater at which a ratio of ozone/COD was 0.4 mg/mg to prepare ozone mixed wastewater, and the prepared ozone mixed wastewater was supplied to the ozone oxidation unit 4. As a result of setting the residence time of the wastewater in the ozone oxidation unit 4 to be one hour and examining the water quality of wastewater passing through the catalyst bed C, the COD was reduced to about 95 mg/L and the concentration of dissolved oxygen was 23.6 mg/L. The ozone concentration of wastewater was about 1.5 mg/L, and the ozone utilization rate was 98%.

This wastewater was introduced into the biological treatment unit 5 as it was, and after about 6 hours, the treated water overflowed from the biological treatment unit 5. The COD concentration of the treated water was 75 mg/L, and the organic matter removal rate in the biological treatment was 21% based on the COD.

Although the embodiments of the present disclosure have been described above with reference to the accompanying drawings, the present disclosure is not limited to such embodiments, and it is to be understood that various changes or modifications that can be conceived by those skilled in the art in the scope described in the claims fall within the technical scope of the present disclosure.

The wastewater treatment device having good treatment efficiency is provided, which can contribute to the prevention of environmental pollution and the like by spreading treatment technology of industrial wastewater. In addition, it is possible to contribute to the effective utilization of resources by reducing the operation cost and the like of the device.

As there are many apparently widely different embodiments of the disclosure that may be made without departing from the spirit and scope thereof, it is to be understood that the disclosure is not limited to the specific embodiments thereof, except as defined in the appended claims.

What is claimed is:

1. A wastewater treatment device, comprising:
   an ozone generator which supplies ozone;
   a mixer which mixes ozone supplied from the ozone generator with wastewater and supplies ozone mixed wastewater;
   an ozone oxidation unit which progresses ozone oxidation in the ozone mixed wastewater while passing the ozone mixed wastewater therethrough and discharges wastewater in which the ozone has been consumed;
   a biological treatment unit which has microorganisms for biological treatment and performs the biological treatment on the wastewater discharged from the ozone oxidation unit using the microorganisms; and
   an adjusting device which adjusts the amount of ozone to be mixed with the wastewater by the mixer so that ozone in an amount that inhibits the microorganisms of the biological treatment unit does not remain in the wastewater discharged from the ozone oxidation unit, wherein
   the ozone oxidation unit has a catalyst that promotes an ozone oxidation reaction by contacting with the ozone mixed wastewater.

2. The wastewater treatment device according to claim 1, wherein the adjusting device includes:
   a measuring device which measures the amount of ozone in the wastewater discharged from the ozone oxidation unit; and
   a regulating valve capable of regulating the amount of ozone to be mixed with the wastewater by the mixer, and
   the regulating valve is adjusted based on measurement by the measuring device in such a manner that the amount of ozone in the wastewater is lower than a level at which the microorganisms are inhibited.

3. The wastewater treatment device according to claim 2, further comprising:
   a release passage for avoiding the supply of the wastewater to the biological treatment unit when the ozone remains in the wastewater discharged from the ozone oxidation unit; and
   a control valve which stops the supply of the wastewater to the biological treatment unit when the amount of ozone in the wastewater is equal to or higher than the level at which the microorganisms are inhibited, based on the measurement by the measuring device.

4. The wastewater treatment device according to claim 3, wherein
   the release passage is a return passage capable of supplying the wastewater discharged from the ozone oxidation unit to the mixer, and
   the wastewater flows through the return passage when the supply of the wastewater to the biological treatment unit is stopped by the control valve.

5. The wastewater treatment device according to claim 2, further comprising:
   an ozone decomposing device which decomposes ozone remaining in the wastewater discharged from the ozone oxidation unit when ozone remains in the wastewater discharged from the ozone oxidation unit.

6. The wastewater treatment device according to claim 1, wherein
the mixer includes a bubble generator, and
ozone is dispersed in the ozone mixed wastewater in a state of bubbles.

7. The wastewater treatment device according to claim 6, wherein the bubble generator is a microbubble generator which generates fine bubbles having a bubble diameter of 10 to 50 μm.

8. The wastewater treatment device according to claim 1, wherein the ozone oxidation unit is configured in a multi-stage structure in which a plurality of catalyst beds on which the catalyst is supported are stacked in a vertical direction, and is configured so that the ozone mixed wastewater sequentially passes through the plurality of catalyst beds while being introduced from a bottom part of the ozone oxidation unit and rising toward a top part of the ozone oxidation unit.

9. The wastewater treatment device according to claim 1, wherein
a difference in height between the biological treatment unit and the ozone oxidation unit is provided so that a water level in the biological treatment unit is lower than that in the ozone oxidation unit, and
the wastewater of the ozone oxidation unit is supplied to the biological treatment unit using a gravity action due to the difference in height.

10. The wastewater treatment device according to claim 1, wherein the catalyst promotes the ozone oxidation reaction in which an organic substance contained in the ozone mixed wastewater decomposes.

11. The wastewater treatment device according to claim 1, wherein the ozone oxidation reaction is promoted by a hydroxyl radical or an ozonide ion generated from the ozone.

12. The wastewater treatment device according to claim 1, wherein
the catalyst comprises a heterogeneous catalyst selected from the group consisting of metal oxides, metal-supported oxides, zeolites, and activated carbon,
the metal oxides include at least one selected from the group consisting of CoO, $MoO_3$, and $MnO_2$, and
the metal-supported oxides include silica gel on which at least one metal selected from the group consisting of Co, Cu, Pb, Ru, Pt and Pd is supported.

13. A wastewater treatment method, comprising:
ozone generation that supplies ozone;
mixing preparation for mixing the ozone supplied by the ozone generation with wastewater to supply ozone mixed wastewater;
ozone oxidation treatment in which ozone oxidation is allowed to proceed in the ozone mixed wastewater, using a catalyst that promotes an ozone oxidation reaction by contacting with the ozone mixed wastewater, to discharge the wastewater in which the ozone has been consumed; and
biological treatment in which the wastewater after the ozone oxidation treatment is biologically treated with microorganisms,
wherein
an amount of ozone mixed with the wastewater in the mixing preparation is adjusted so that ozone in an amount that inhibits the microorganisms of the biological treatment does not remain in the wastewater discharged from the ozone oxidation treatment.

14. The wastewater treatment method according to claim 13, wherein a ratio of ozone to be mixed with the wastewater is adjusted according to a flow rate of the wastewater supplied to the ozone oxidation treatment and water quality of the wastewater so that an appropriate amount of ozone is mixed with the wastewater in the mixing preparation.

15. The wastewater treatment method according to claim 13, which is applied to an advanced treatment for treating industrial wastewater containing a persistent organic substance.

16. The wastewater treatment device according to claim 1, wherein the catalyst comprises a heterogeneous catalyst selected from metal oxides, metal-supported oxides, platinum group metals, zeolites, and activated carbon.

17. The wastewater treatment device according to claim 16, wherein the metal oxides include $Fe_2O_3$, CoO, $MoO_3$, $MnO_2$, $SiO_2$, $Al_2O_3$ and $TiO_2$, and the metal-supported oxides include silica gel and titania on each of which a metal selected from Co, Cu, Pb, Ru, Pt and Pd is supported.

18. The wastewater treatment method according to claim 13, wherein the catalyst comprises a heterogeneous catalyst selected from metal oxides, metal-supported oxides, platinum group metals, zeolites, and activated carbon.

19. The wastewater treatment method according to claim 18, wherein the metal oxides include $Fe_2O_3$, CoO, $MoO_3$, $MnO_2$, $SiO_2$, $Al_2O_3$ and $TiO_2$, and the metal-supported oxides include silica gel and titania on each of which a metal selected from Co, Cu, Pb, Ru, Pt and Pd is supported.

* * * * *